(12) United States Patent
Tighe et al.

(10) Patent No.: US 6,345,787 B1
(45) Date of Patent: Feb. 12, 2002

(54) AIRCRAFT LANDING GEAR

(75) Inventors: David J Tighe; Stephen P Briancourt, both of Bristol (GB)

(73) Assignee: Bae Systems plc, Farnborough (GB)

( * ) Notice: Subject to any disclaimer, the term of this patent is extended or adjusted under 35 U.S.C. 154(b) by 0 days.

(21) Appl. No.: 09/529,381

(22) PCT Filed: Mar. 21, 2000

(86) PCT No.: PCT/GB00/01045

§ 371 Date: Apr. 13, 2000

§ 102(e) Date: Apr. 13, 2000

(87) PCT Pub. No.: WO98/46123

PCT Pub. Date: Oct. 22, 1998

(30) Foreign Application Priority Data

Apr. 6, 1999 (GB) ............................................. 9907642

(51) Int. Cl.[7] .............................................. B64C 25/04
(52) U.S. Cl. .............................. 244/102 R; 244/102 A; 244/102 SL
(58) Field of Search ........................ 244/102 R, 102 A, 244/102 SL

(56) References Cited

U.S. PATENT DOCUMENTS

| 4,328,939 A | * | 5/1982 | Davies et al. ........... 244/102 R |
| 4,392,623 A | | 7/1983 | Munsen et al. ......... 244/102 R |
| 4,645,143 A | | 2/1987 | Coffy ..................... 244/100 R |
| 4,681,284 A | * | 7/1987 | Veaux et al. ............ 244/102 R |
| 5,100,083 A | * | 3/1992 | Large et al. ............ 244/102 R |

FOREIGN PATENT DOCUMENTS

| DE | 417 051 C | 8/1925 |
| EP | 0 533 531 A1 | 3/1993 |
| GB | 699991 | 11/1953 |
| GB | 2 094 241 A | 9/1982 |
| GB | 2 271 747 A | 4/1994 |
| SU | 1 827 991 A | 6/1996 |

* cited by examiner

*Primary Examiner*—J. Woodrow Eldred
(74) *Attorney, Agent, or Firm*—Nixon & Vanderhye P.C.

(57) ABSTRACT

An aircraft landing gear comprises four mounting members 14, 15, 18, 19 attached to an airframe of the aircraft via attachments 14a, 15a, 16a. One of the attachments 16a is in the form of a leaf spring 30 which can flex upwards and downwards but is non-displaceable in a side-to-side direction thereby reducing induced loading in the mounting members resulting from airframe deflection.

15 Claims, 2 Drawing Sheets

AIRCRAFT LANDING GEAR

BACKGROUND TO THE INVENTION

The invention relates to an aircraft landing gear and is primarily concerned with a landing gear which, in use, is attached at four-points to part of an airframe.

Where an undercarriage having four mounting members connected to the airframe by four attachments is locked in a down position, the loading in the individual mounting members is statically indeterminate and deflection of the airframe can induce substantial forces in the individual mounting members.

SUMMARY OF THE INVENTION

An object of the present invention is to provide a landing gear in which such induced loading will be reduced.

According to a first aspect of the invention there is provided an aircraft landing gear including a plurality of mounting members to be attached to an airframe of the aircraft via respective attachments, one of the attachments being displaceable in one direction and substantially non-displaceable in a transverse direction thereby reducing induced loading in the members resulting from airframe deflection.

In that way, the landing gear is much more able to accommodate loading resulting from the aforesaid airframe deflection as the load which would otherwise be induced in the mounting members is reduced.

According to a second aspect of the invention there is provided an aircraft landing gear including a plurality of mounting members to be attached to an airframe of the aircraft via respective attachments, one of the attachments being displaceable in one direction with its associated mounting member being substantially non-displaceable in a transverse direction thereby reducing induced loading in the members resulting from airframe deflection.

Preferably, the displaceable attachment is displaceable in an up-and-down direction Preferably, the displaceable attachment or associated mounting member is non-displaceable in a side-to-side sense in relation to the fore-and-aft direction of the aircraft. In that way, sideways stability of the landing gear remains unaffected by the use of the displaceable attachment and torque on the landing gear leg can still be reacted through the displaceable attachment.

The displaceable attachment is preferably flexible and, in that respect, may be a spring such as a leaf spring. In the latter case, the leaf spring may extend in a side-to-side direction to provide the sideways stability and torque reaction capabilities, as previously discussed.

In a preferred embodiment, the displaceable attachment defines a pintle axis for its associated mounting member, which may be a landing gear leg, or "main fitting".

Preferably, the displaceable attachment comprises an arm which, in use, is pivotally mounted at one end to the airframe. In such a case, the aforesaid pintle axis is preferably spaced from the pivotal mounting for the arm. Conveniently, the opposite end of the arm may, in use, be pivotally connected to the airframe through a link. The link permits displacement of the arm to take place about the pivot without inducing longitudinal forces in the arm.

The member associated with the displaceable attachment may be a forward mounting member of the landing gear.

In a preferred embodiment, two of the said mounting members are in the form of side stays.

According to a third aspect of the invention there is provided a landing gear according to the first or second said aspect of the invention or any of the consistory clauses relating thereto.

According to a fourth aspect of the invention there is provided an aircraft wing having landing gear thereon according to the first or second said aspect of the invention or any of the consistory clauses relating thereto.

According to a fifth aspect of the invention there is provided an aircraft having a landing gear according to the first or second said aspect of the invention or any of the consistory clauses relating thereto.

BRIEF DESCRIPTION OF THE DRAWINGS

An aircraft landing gear according to the invention will now be described by way of example with reference to the accompanying drawings in which.

DESCRIPTION OF THE PREFERRED EMBODIMENT

Figure 1:
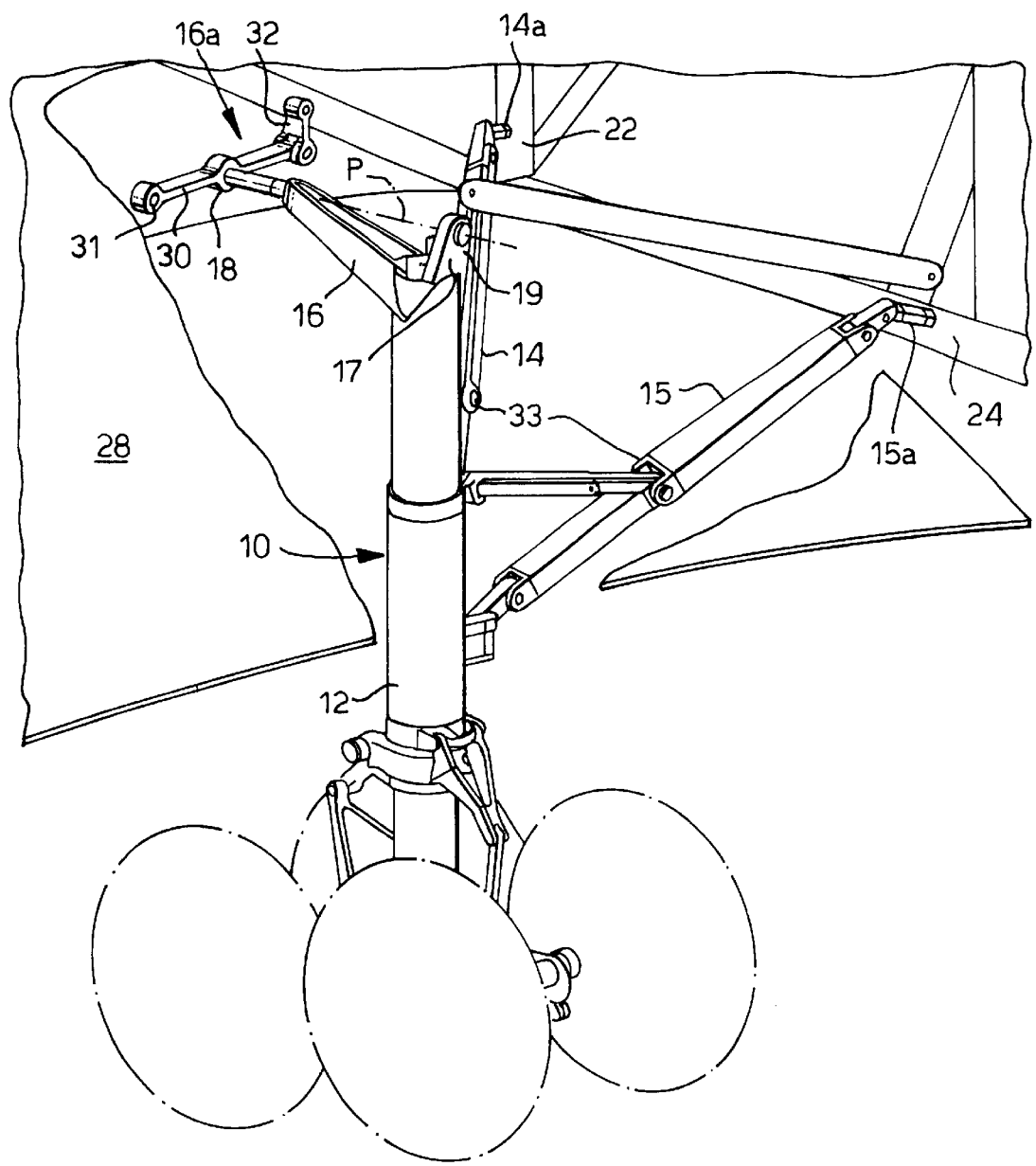
FIG. 1 is a diagrammatic perspective view of one form of landing gear in accordance with the invention and FIG. 2 is a perspective view to a larger scale of a displaceable attachment of the landing gear of FIG. 1.
Figure 2:
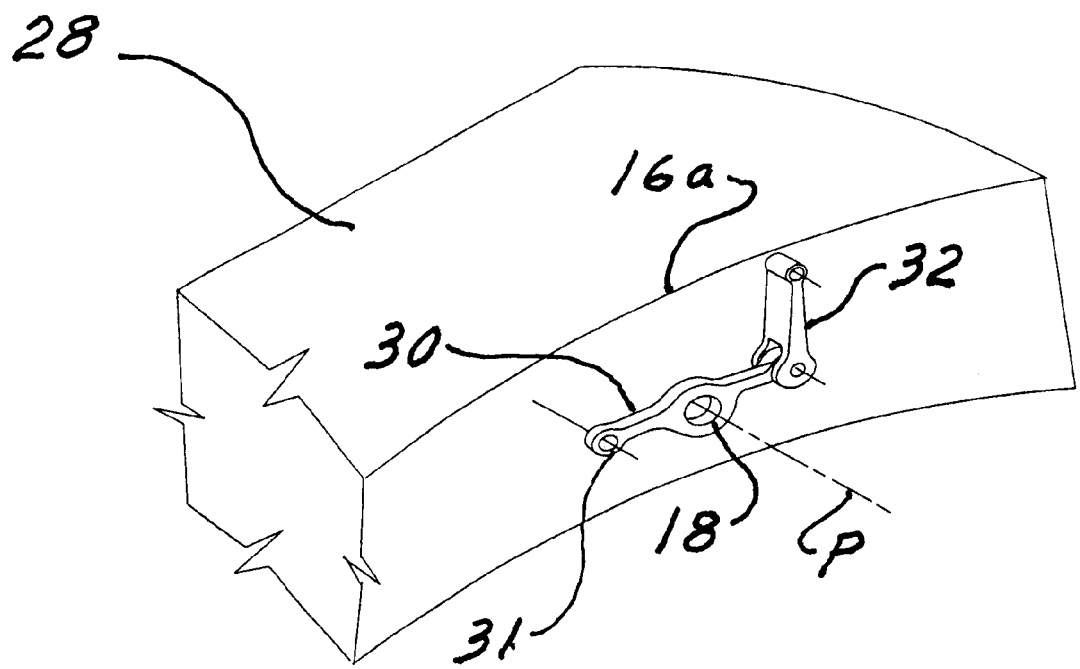

In FIG. 1 a landing gear is generally indicated at 10 and basically comprises a leg 12 connected to fore-and-aft side stays 14, 15 respectively. The leg 12 is also connected through arms 16, 17 to front and rear pintle bearings 18, 19. The pintle bearings 18, 19 define a common fore-and-aft axis P known as the pintle axis. The side stays 14, 15 and pintle bearings 18, 19 effectively form a four point attachment for the landing gear, the side stays being connected by attachments 14a, 15a to parts 22, 24 of a fuselage. The pintle bearing 18 is connected by an attachment 16a to a wing 28 extending from the fuselage and the pintle bearing 19 is connected to the wing 28 and/or fuselage by a further attachment (not shown).

As mentioned above, a four point attachment is a statically indeterminate structure. Relative deflection between the wing 28 and the fuselage tends to induce substantial forces in the structure and the present invention is intended to accommodate such relative deflection and reduce such induced loading.

The attachment 16a comprises a displaceable member which, in the embodiment shown, is in the form of a leaf spring 30. The leaf spring 30 is mounted on a pivot 31 at one end which is itself mounted on the wing 28 and is pivotally connected at its other end to a link 32 which is itself pivotally connected to the wing 28. The pintle bearing 18 is positioned on the leaf spring 30 about midway between the ends of the leaf spring.

With the landing gear 10 supporting the aircraft, the side stays 14, 15 act to brace the leg 12 against pivoting about the pintle axis P. When the landing gear is to be retracted, each side stay 14, 15 articulates about a centre pivot 33 in response to the unlocking and folding of a pair of lock links (not shown) acting between the leg 12 and its associated side stay. Operation of a retraction actuator (not shown) then raises the undercarriage leg 12 about the pintle axis P to a stowed position in the wheel bay (not shown).

Should relative deflection occur between the wing 28 and fuselage with the landing gear 10 in the FIG. 1 position, ie with the side stays locked, the resulting forces induced in the side stays 14, 15 and the arms 16, 17 will cause the arm 16 to displace the leaf spring 30 upwards or downwards so that it flexes between the pivot 31 and the link 32. Such deflections can be induced whenever the side stays are locked as aforesaid, such as when the aircraft is sitting stationary on the ground, when wing bending occurs in flight before gear retraction, and when the aircraft touches down upon landing. In the latter circumstances in particular both drag loads on the gear and "springback" loads occurring immediately after touchdown can cause the leaf spring 30 to deflect both downwardly and upwardly respectively. The link 32 is designed to prevent a build up of axial force in the leaf spring 30 resulting from displacement of the spring. In that way, the landing gear 10 is much more able to accommodate loading resulting from the aforesaid relative deflection and reduces the load which would otherwise be induced in the side stays 14, 15 and arms 16, 17.

The use of the leaf spring 30 mounted on the pin 31 provides resistance against sideways movement thereby providing positive sideways location for the arm 16. In that way, the front pintle bearing 18 will react against side loading. Also, the spring 30 is sufficiently flexible to allow controlled flexibility in the up and down direction whilst at the same time supporting the pintle bearing 14 with sufficient stiffness to provide an accurate location for the pintle bearing during gear retraction and deployment. It is also sufficiently stiff to resist large deflections of the landing gear 10 due to air-induced loads after take off or when coming in to land.

What is claimed is:

1. An aircraft landing gear movable between a retracted position and a locked down position, said gear having four mounting members for attachment of the landing gear to an airframe of the aircraft via respective attachments for mounting the landing gear in a locked down position, one of the attachments with the gear in said locked down position is displaceable in one direction but substantially non-displaceable in a transverse direction thereby reducing induced loading in the members resulting from the airframe deflection.

2. An aircraft landing gear according to claim 1 in which the displaceable attachment defines a pintle axis for a leg of the landing gear.

3. An aircraft landing gear according to claim 1 in which the displaceable attachment can move upwards and downwards.

4. An aircraft landing gear according to claim 1, in which the displaceable attachment is non-displaceable in a side-to-side sense in relation to the fore-and-aft direction of the aircraft.

5. An aircraft landing gear according to claim 4 in which the displaceable attachment is a spring.

6. An aircraft landing gear according to claim 5 in which the spring is a leaf spring.

7. An aircraft landing gear according to claim 1 in which the displaceable attachment comprises an arm which, in use, is pivotally mounted at one end to the airframe.

8. An aircraft landing gear according to claim 7 in which the displaceable attachment defines a pintle axis for a leg of the landing gear and in which the pintle axis is spaced from the pivotal mounting for the arm.

9. An aircraft landing gear according to claim 7 in which the opposite end of the arm is, in use, pivotally connected to the airframe through a link.

10. An aircraft landing gear according to claim 1 in which four mounting members are provided.

11. An aircraft landing gear according to claim 1 in which the mounting members include side-stays.

12. An aircraft wing including a landing gear according to claim 1.

13. An aircraft fuselage including a landing gear according to claim 1.

14. An aircraft including a landing gear according to claim 1.

15. An aircraft landing gear movable between a retracted position and a locked down position, said gear having four mounting members for attachment of the landing gear to an airframe of the aircraft via respective attachments for mounting the landing gear in a locked down position, one of the attachments with the gear in said locked down position is displaceable in one direction with an associated mounting member being substantially non-displaceable in a transverse direction thereby reducing induced loading in the members resulting from the airframe deflection.

\* \* \* \* \*

UNITED STATES PATENT AND TRADEMARK OFFICE
CERTIFICATE OF CORRECTION

PATENT NO.    : 6,345,787 B1
DATED         : February 12, 2002
INVENTOR(S)   : Tighe et al.

It is certified that error appears in the above-identified patent and that said Letters Patent is hereby corrected as shown below:

<u>Title page,</u>
Item [73], Assignee: "Bae Systems plc" should read -- BAE SYSTEMS plc --
Item [87], PCT Pub. Date: "Oct. 22, 1998" should read -- Oct. 12, 2000 --

Signed and Sealed this

Twenty-second Day of October, 2002

Attest:

Attesting Officer

JAMES E. ROGAN
*Director of the United States Patent and Trademark Office*